United States Patent
Ouyang

(10) Patent No.: US 7,263,048 B2
(45) Date of Patent: Aug. 28, 2007

(54) METHOD FOR DECODING DISC INFORMATION

(75) Inventor: Sl Ouyang, Taipei Hsien (TW)

(73) Assignee: VIA Technologies Inc., Taipei Hsien (TW)

( * ) Notice: Subject to any disclaimer, the term of this patent is extended or adjusted under 35 U.S.C. 154(b) by 790 days.

(21) Appl. No.: 10/604,510

(22) Filed: Jul. 28, 2003

(65) Prior Publication Data
US 2004/0196710 A1    Oct. 7, 2004

(30) Foreign Application Priority Data
Apr. 2, 2003    (TW) .............................. 92107481 A

(51) Int. Cl.
*G11B 7/00*    (2006.01)
(52) U.S. Cl. .............................. 369/53.35; 369/59.19; 369/47.19; 369/124.04
(58) Field of Classification Search .................... None
See application file for complete search history.

(56) References Cited

U.S. PATENT DOCUMENTS 5,912,869 A * 6/1999 Tanaka et al. ........... 369/59.23
6,175,542 B1 * 1/2001 Okada et al. ............ 369/59.17
6,392,569 B1 * 5/2002 Mimachi et al. .............. 341/58
6,721,254 B1 * 4/2004 Yamaguchi .............. 369/53.35

* cited by examiner

*Primary Examiner*—William Korzuch
*Assistant Examiner*—Peter Vincent Agustin
(74) *Attorney, Agent, or Firm*—Jianq Chyun IP Office

(57) ABSTRACT

A pre-treating circuit for accessing the disc and a method thereof, which are especially used for treating the signal waveform that violates the encoding rule of the disc information, are provided. The present invention can modulate the signal waveform that violates the encoding rule, so that the waveform is not changed during at least 3 continuous periods of the clock signal. The present invention also replaces any wrong 16-bit data which violate the encoding rule, with approximated 16-bit data before they are decoded, or receives approximated 8-bit data which correspond to the incorrect 16-bit data, by directly referring to a table. Therefore, the subsequent decoding module can acquire more data for continuous processing, so as to improve the data reading reliability and to prevent the "picky disc" or "disc error reading" problem from happening.

5 Claims, 5 Drawing Sheets

METHOD FOR DECODING DISC INFORMATION

CROSS REFERENCE TO RELATED APPLICATIONS

This application claims the priority benefit of Taiwan application serial no. 92107481, filed Apr. 2, 2003.

BACKGROUND OF INVENTION

1. Field of Invention

The present invention generally relates to a method for treating and decoding data signals in optical storage media, and more particularly, to a method for pre-treating the data signals and decoding the data when they are read out from the disc.

2. Description of Related Art

In order to accommodate the characteristic of the disc, and to increase the reliability of read disc information, the data are treated by an Eight to Fourteen Modulation (EFM) and a Reed-Soloman code modulation process when they are stored in the compact disk (CD), and the sequence for storing the data is amended in an interleaved manner. In order to read the data from the CD disc, at first, the laser beam reflected by the CD is reacted so as to obtain radio frequency data (RF DATA), and to generate a digital data signal DSEFM and a clock signal EFMCLK according to the RF DATA. Then, these two signal data are decoded by using the EFM process, so as to perform the subsequent decoding process for the CD information.

The CD disc stores information in a manner that changes the CD"s current burning status in the CD disc when recording data "1" and not changing the CD"s current burning status in the CD disc when recording data "0". The so-called EFM process converts 8-bit data into 14-bit data, the data after processed by the EFM process are then stored in the CD disc. The 14-bit data after processed by the EFM process complies with a basic rule, i.e., the duration of the same burning status stored in the CD disc must be greater than or equal to 3 periods of EFMCLK and smaller than or equal to 11 periods of EFMCLK. In other words, the signal waveform of the DSEFM is not changed during 3 periods of the EFMCLK, and the signal waveform of the DSEFM must be changed within a duration less than or equal to 11 periods of the EFMCLK. On the perspective of 14-bit data, the number of data "0" appears in two contiguous data "1" is greater than 2 and less than 10.

The principle of the EFM process mentioned above is also applied in the current generation DVD (Digital Versatile Disc). However, the 8-bit to 14-bit modulation process is changed to an 8-bit to 16-bit modulation process, and the rule is changed to the duration of the same burning status stored in the DVD must be greater than or equal to 3 periods of EFMCLK and smaller than or equal to 11 periods of EFMCLK.

Since the data storage density of the DVD is very high, and the reading speed of the CD driver currently used is getting higher now, plus the CD is characterized that it is easily scratched. Therefore, during the process of reading out data from DVD, it is very possible to generate 16-bit data, which violates the modulation rule mentioned above. If the data are sent to the subsequent demodulation module directly for processing without being processed by using adequate CD information decoding method and apparatus first, the reliability of the data reading deteriorates and the "picky disc" or "disc error reading" problem occurs.

SUMMARY OF INVENTION

Therefore, the present invention provides a method for decoding the disc information and a pre-treating circuit for processing the disc information, which are used to especially treat the 16-bit data, which violates the modulation rule when read out from a disc, e.g. a DVD, which stores information that is processed by the 8-bit to 16-bit modulation, so as to improve the data reading reliability, and to prevent the "picky disc" or "disc error reading" problem from happening.

In order to achieve the object mentioned above and others, the present invention provides a method for decoding the disc information. The method comprises following steps. At first, a received original data signal and a clock signal are read out from a frontend circuit. Then, the original data signal is modulated when the duration of the same status of the original data signal is less than the transit period, so as to obtain a waveform-guaranteed data signal. Here, the duration of the same status of the waveform-guaranteed data signal is greater than or equal to a minimum transit period, and the minimum transit period is calculated according to the clock signal. The waveform-guaranteed data signal and the clock signal are then used by a backend processing unit for continuously decoding, so as to obtain the disc information.

In accordance with the method for decoding the disc information of the preferred embodiment according to the present invention, the step of determining whether the duration of the same status of the original data signal is less than the minimum transit period of the clock signal or not, e.g. 3 periods of clock signal, so as to modulate the original data signal and then obtain the waveform-guaranteed data signal, comprises the steps as follows. At first, a first reference data signal is generated according to the original data signal. Wherein, the first reference data signal lags the original data signal, and the two signals differ at least with reference to the lag period of the clock signal, e.g., 1.5 period of the clock signal. The rising edge of the first reference data signal is generated fixed on the rising edge or the falling edge of the clock signal, and the duration of the same status of the first reference data signal is greater than or equal to the minimum transit period of the clock signal. Then, the first reference data signal is delayed to obtain a second reference data signal, and the difference between two signals is one period of the clock signal. Finally, when the duration of the same status of the first reference data signal is less than the minimum transit period of the clock signal, the first reference data signal is used to generate the waveform-guaranteed data signal. Otherwise, the second reference data signal is used to generate the waveform-guaranteed data signal.

In the method for decoding the disc information of the preferred embodiment mentioned above, wherein the step of determining whether the original data signal lags behind the transit or not, comprises following steps. At first, the duration of the same status of the original data signal is counted according to the rising edge of the clock signal, so as to obtain a rising edge counting value. Then, the duration of the same status of the original data signal is counted according to the falling edge of the clock signal, so as to obtain a falling edge counting value. Finally, it is determined that the original data signal lags behind the transit if the rising edge counting value is greater than the falling edge counting value.

The present invention further provides a method for decoding the disc information, for example, a method for decoding the DVD information, wherein the method comprising following steps. At first, serial data are received, for example, the original data signal and the clock signal are received as mentioned above, and the original data signal is modulated when it is determined that the duration of the same status of the original data signal is less than the minimum transit period, so as to obtain a guaranteed-waveform data signal and have the duration of the same status of the guaranteed-waveform data signal be greater than the minimum transit period, so that a serial data is obtained from the guaranteed-waveform data signal according to the clock signal. Then, 16-bit data are extracted from the serial data, and the 16-bit data are encoded to obtain 12-bit data. Then, the 12-bit data are converted into 8-bit data by querying a modified decoding table. Finally, the 8-bit data are output. Wherein, the modified decoding table mentioned above has an abnormal 12-bit to 8-bit conversion information. Here, the 12-bit data of the abnormal 12-bit to 8-bit conversion information belonging to the portion which is received by querying table, is abnormal 12-bit data, and the abnormal 12-bit data are obtained by encoding abnormal 16-bit data that violate the encoding rule of the disc information, for example, in such abnormal 16-bit data, the number of the data "0" appears in two contiguous data "1" is less than 2.

The present invention further provides a method for decoding the disc information. The method comprises following steps. At first, serial data is received, for example, using the method mentioned above to receive the serial data. Then, 16-bit data are extracted from the serial data. Then, the 16-bit data are modulated when it is determined that the 16-bit data violate the encoding rule of the disc information, for example, when the number of the data "0" appears in two contiguous data "1" of the 16-bit data is less than 2, it is modulated to have the number of the data "0" appears in two contiguous data "1" equal 2. Then, the 16-bit data are encoded so as to obtain 12-bit data, and the 12-bit data is converted into 8-bit data by querying the table. Finally, the 8-bit data is output.

From another perspective of the present invention, the present invention provides a pre-treating circuit for accessing the disc, so as to obtain a guaranteed-waveform data signal according to the original data signal and the clock signal. The pre-treating circuit for accessing the disc comprises a waveform synthesizer, a delay unit, a lag determining & selecting circuit, and a delayed multiplexer. The waveform synthesizer generates a first reference data signal by receiving the original data signal and the clock signal. Wherein, the first reference data signal lags the original data signal, and two signals differ by at least one reference lag period of the clock signal, for example, 1.5 period of the clock signal. The rising edge of the first reference data signal is generated fixed on a transit edge of the clock signal, for example, fixed on the rising edge or on the falling edge. The duration of the same status of the first reference data signal is greater than or equal to the minimum transit period of the clock signal, e.g. 3 periods of the clock signal. The delay unit is coupled to the waveform synthesizer and used to delay the first reference data signal one period of the clock signal, so as to obtain a second reference data signal. The lag determining & selecting circuit is used to determine whether the duration of the same status of the original data signal is less than the minimum transit period of the clock signal or not, and to determine whether this is caused by the original data signal being lagged behind the transmit or not, so as to output a selection signal. The delayed multiplexer is coupled to the waveform synthesizer, the delay unit, and the lag determining & selecting circuit. The delayed multiplexer is used to select the first reference data signal to generate the guaranteed-waveform data signal according to the selection signal when it is determined that the duration of the same status of the original data signal is less than the minimum transit period of the clock signal caused by the original data signal delaying the transmit. Otherwise, the second reference data signal is selected to generate the guaranteed-waveform data signal.

In accordance with the pre-treating circuit for accessing the disc of the preferred embodiment according to the present invention, wherein the lag determining & selecting circuit comprises a rising edge counter, a falling edge counter, and a controlling circuit. The rising edge counter counts the duration of the same status of the original data signal according to the rising edge of the clock signal, so as to obtain a rising edge counting value. The falling edge counter counts the duration of the same status of the original data signal according to the falling edge of the clock signal, so as to obtain a falling edge counting value. The controlling circuit is coupled to the rising edge counter and the falling edge counter and is used to determine whether the original data signal lags behind the transit or not when the rising edge counting value is greater than the falling edge counting value, so as to appropriately output a selection signal.

Compared with the prior art, the present invention could especially treat 16-bit data that violate the modulation rule, for example, the pre-treating circuit for accessing the disc and a method thereof are used to modulate the DSEFM signal waveform, so that the waveform is not changed during at least three continuous periods of the EFMCLK. The present invention also replaces any wrong 16-bit data, which violate the modulation rule, by a guessed approximated 16-bit data before it is decoded, or receives approximated 8-bit data, which corresponding to the wrong 16-bit data, by directly referring to a table. Therefore, the subsequent process module can acquire more data for its continuous processing, so as to improve the data reading reliability and to avoid the "picky disc" or "disc error reading" problem resulting from the existence of 16-bit data that violate the modulation rule in the prior art.

BRIEF DESCRIPTION OF DRAWINGS

The accompanying drawings are included to provide a further understanding of the invention, and are incorporated in and constitute a part of this specification. The drawings illustrate embodiments of the invention, and together with the description, serve to explain the principles of the invention.

DETAILED DESCRIPTION

Figure 1:
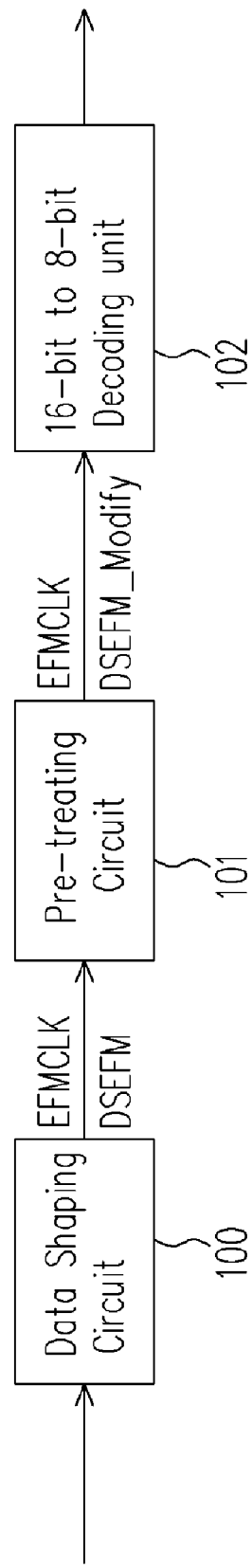
FIG. 1 schematically shows a partial functional diagram for decoding the DVD information of a preferred embodiment according to the present invention.

FIG. 1 schematically shows a partial functional diagram for decoding the DVD information of a preferred embodiment according to the present invention. Referring to FIG. 1, when the information on the DVD is being read, the sensor (not shown) senses a laser beam so as to obtain a radio frequency data (RF DATA). A digital original data signal DSEFM and a clock signal EFMCLK are generated after the RF DATA is processed by a data shaping circuit 100. These two signals are then sent to a pre-treating circuit 101 provided by the present invention, so as to obtain a guaranteed-waveform data signal DSEFM_Modify.

The pre-treating circuit 101 works on the clock signal EFMCLK and the original data signal DSEFM, when these two signals do not comply with the encoding rule of the disc, e.g., when the duration of the same status of the original data signal DSEFM is less than a minimum transit period of the clock signal, the original data signal DSEFM is modulated, so that the duration of the same status of the output guaranteed-waveform data signal DSEFM_Modify is greater than or equal to the minimum transit period of the clock signal. In the present embodiment, the minimum transit period is 3 periods of the clock signal. However, it will be apparent to one of the ordinary skill in the art that the pre-treating circuit 101 can also skip the modulation of the signal waveform in accordance with the configuration setup of the disc decoding system, so that the waveform of the guaranteed-waveform data signal DSEFM_Modify is equal to the waveform of the original data signal DSEFM.

The 16-bit to 8-bit decoding unit 102 mainly performs a decoding operation according to the encoding rule of the DVD disc. Digital serial data obtained according to the guaranteed-waveform data signal DSEFM_Modify and the clock signal EFMCLK are received first, then decoded and converted into an 8-bit data, and the 8-bit data are output to subsequent demodulation modules for further process.

Figure 2:
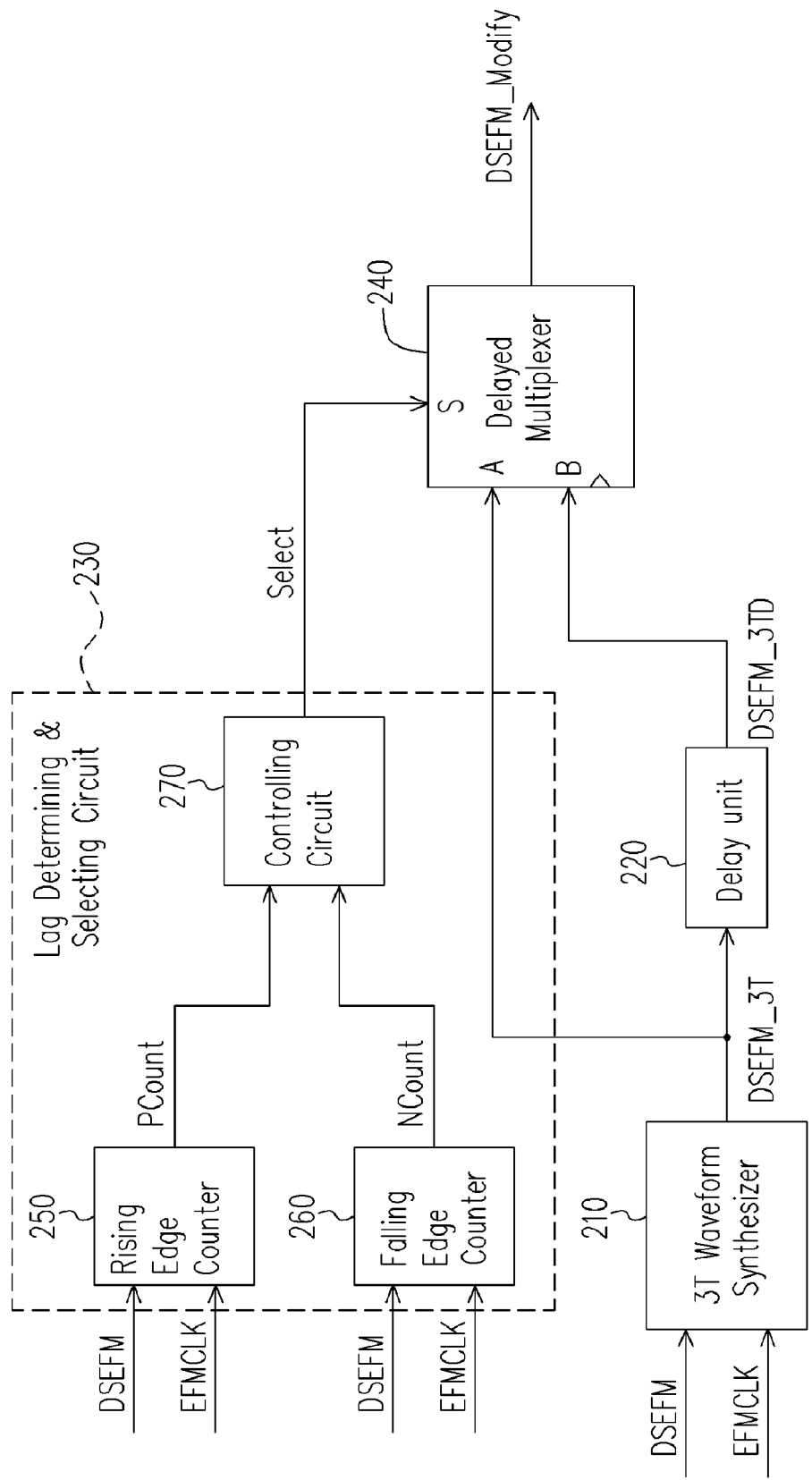
FIG. 2 schematically shows a block diagram of a pre-treating circuit for accessing the disc of a preferred embodiment according to the present invention.

FIG. 2 schematically shows a block diagram of a pre-treating circuit for accessing the disc of a preferred embodiment according to the present invention. Referring to FIG. 2, the pre-treating circuit for accessing the disc provided by the present invention acquires a guaranteed-waveform data signal, DSEFM_Modify according to the original data signal DSEFM and the clock signal EFMCLK. The pre-treating circuit for accessing the disc comprises a 3T waveform synthesizer 210, a delay unit 220, a lag determining & selecting circuit 230, and a delayed multiplexer 240. The lag determining & selecting circuit 230 comprises a rising edge counter 250, a falling edge counter 260, and a controlling circuit 270.

Figure 3:
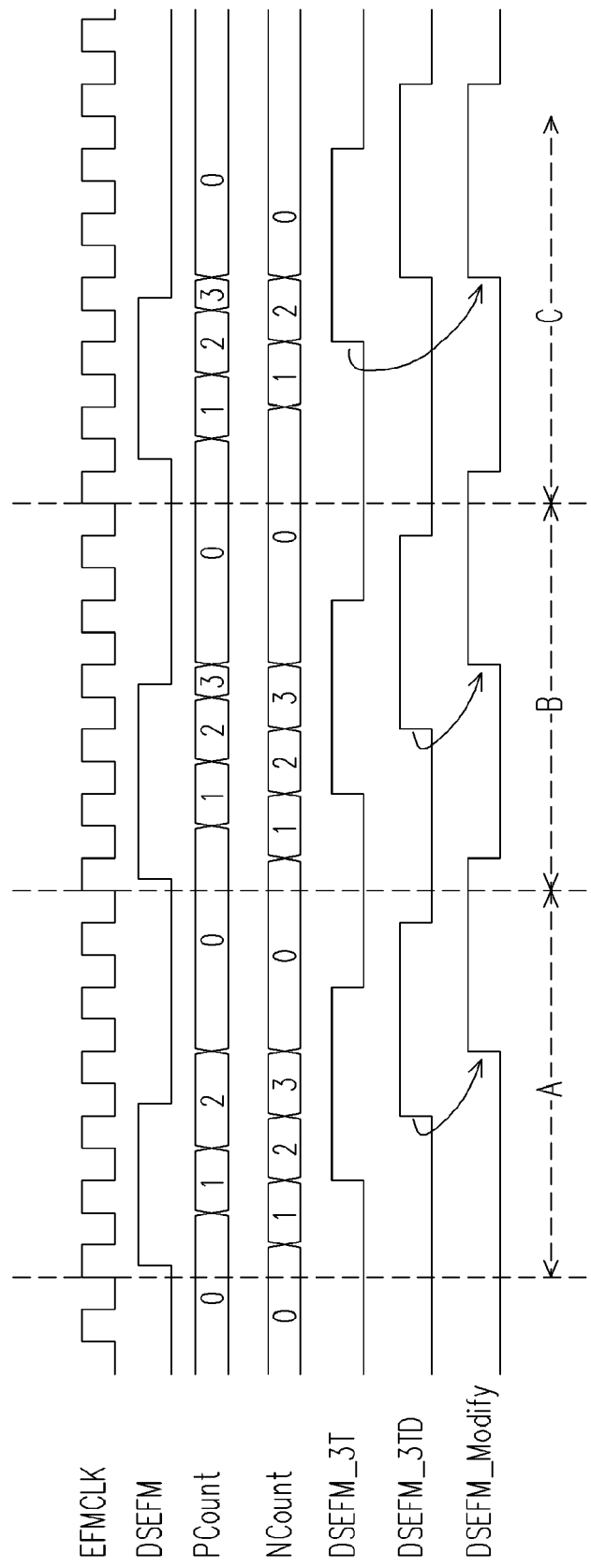
FIG. 3 schematically shows a signal waveform diagram of the preferred embodiment in FIG. 2.

FIG. 3 schematically shows a signal waveform diagram of the preferred embodiment in FIG. 2. Referring to both FIG. 2 and FIG. 3, the 3T waveform synthesizer 210 receives the original data signal DSEFM and the clock signal EFMCLK, so as to generate a first reference data signal DSEFM_3T. As shown in FIG. 3, although the original data signal DSEFM does not comply with the encoding rule of the disc in some points, that is, the duration of the same status is less than the minimum transit period of the clock signal EFMCLK. However, the duration of the same status of the first reference data signal DSEFM_3T is at least equal to the minimum transit period of the clock signal EFMCLK (please note the difference between the DSEFM and DSEFM_3T, especially as to the variance of the graph length for three positive signals thereof). Even though the rising edge of the original data signal DSEFM happens in the rising edge or the falling edge of the clock signal EFMCLK, the rising edge of the first reference data signal DSEFM_3T is generated fixed on the falling edge of the clock signal EFMCLK. Further, the first reference data signal DSEFM_3T lags behind the original data signal DSEFM at least one reference lag period of the clock signal EFMCLK. In the present embodiment, it means it lags at least 1.5 period of the clock signal EFMCLK.

However, it is emphasized that the embodiment depicted in FIG. 3 is only one embodiment of the present invention. In fact, it is correct as long as the rising edge of the first reference data signal DSEFM_3T is generated fixed on a transmit edge of the clock signal EFMCLK. In other words, it can be generated either fixed on the rising edge or on the falling edge of the clock signal EFMCLK. Furthermore, the first reference data signal DSEFM_3T being lagged behind the original data signal DSEFM does not necessarily have to be at least 1.5 period of the clock signal EFMCLK.

The delay unit 220 is used to delay the first reference data signal DSEFM_3T, so that it lags one period of the clock signal so as to obtain a second reference data signal DSEFM_3TD. The lag determining & selecting circuit 230 is mainly used to determine whether the duration of the same status of the original data signal DSEFM is less than the minimum transit period of the clock signal EFMCLK or not, and to determine whether it is caused by the original data signal DSEFM lags behind the transit or not. If both conditions mentioned above are satisfied, the lag determining & selecting circuit 230 enables a selecting signal "Select", which it outputs.

The rising edge counter 250 in the lag determining & selecting circuit 230 counts the duration of the same status of the original data signal DSEFM according to the rising edge of the clock signal EFMCLK, so as to obtain a rising edge counting value PCount. Meanwhile, the falling edge counter 260 counts the duration of the same status of the original data signal DSEFM according to the falling edge of the clock signal EFMCLK, so as to obtain a falling edge counting value NCount. The controlling circuit 270 is used mainly to enable the selecting signal "Select", which it outputs when it is determined that the rising edge counting value PCount is greater than the falling edge counting value NCount as shown in the portion C of FIG. 3, from which it is known that the original data signal DSEFM lags behind the transit. Otherwise, when the rising edge counting value PCount is equal to the falling edge counting value NCount, as shown in the portion B of FIG. 3, or when the rising edge counting value PCount is less than the falling edge counting value NCount, as shown in the portion A of FIG. 3, the selecting signal "Select" is disabled.

The delayed multiplexer 240 selectively delays the first reference data signal DSEFM_3T, so as to generate the guaranteed-waveform data signal DSEFM_Modify according to the selecting signal "Select" when the selecting signal "Select" is enabled, that is when the duration of the same status of the original data signal DSEFM is less than the minimum transit period of the clock signal EFMCLK is caused by the original data signal DSEFM lags behind the transit, as shown in the portion C of FIG. 3. Otherwise, when the duration of the same status of the original data signal DSEFM is equal to the minimum transit period of the clock signal EFMCLK, as shown in the portion B of FIG. 3, or it is caused by the original data signal DSEFM is transited ahead of schedule, as shown in the portion A of FIG. 3, the second reference data signal DSEFM_3TD is selectively delayed, so as to generate the guaranteed-waveform data signal DSEFM_Modify.

Figure 4:
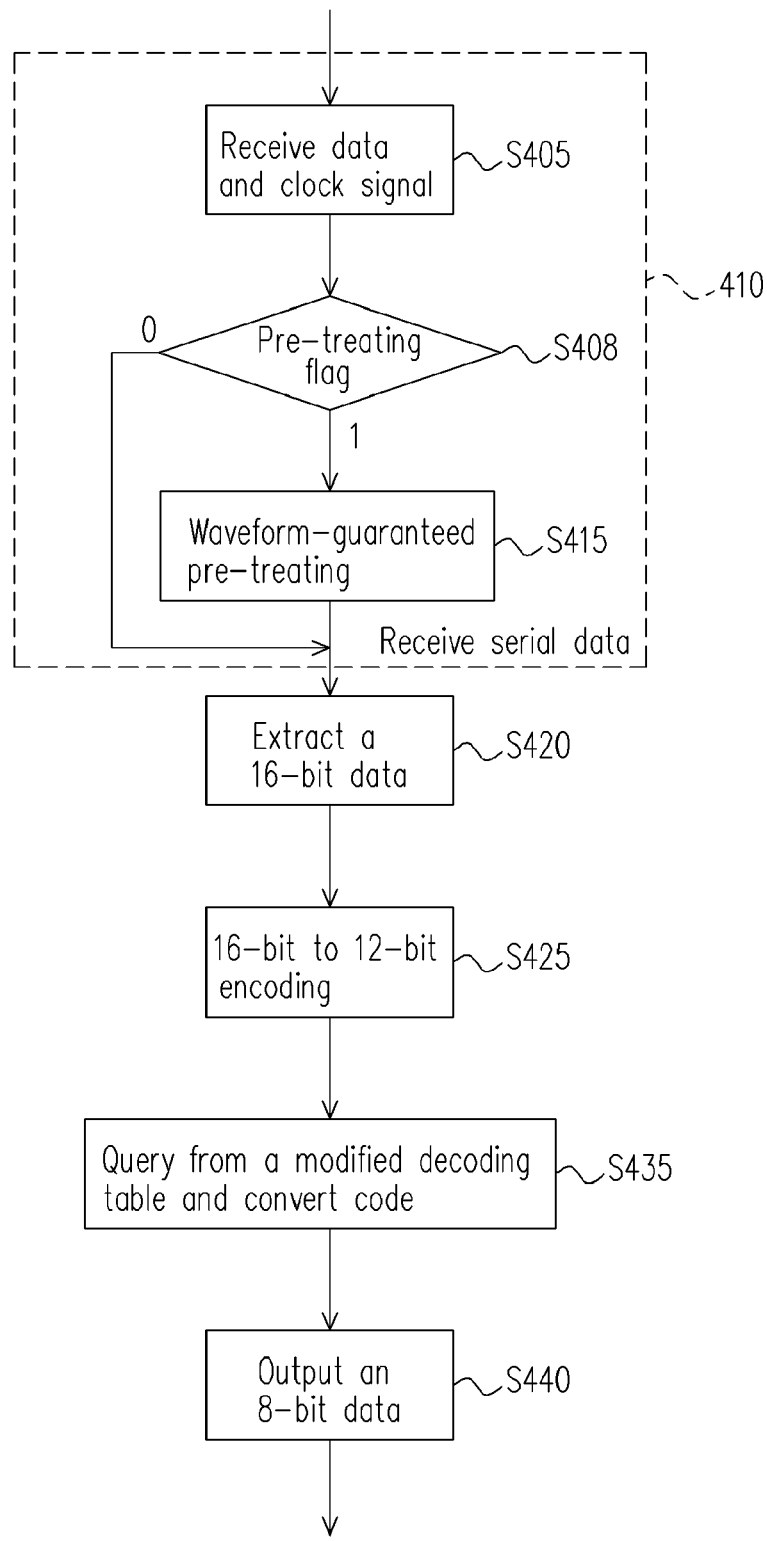
FIG. 4 schematically shows a flow chart of a method for decoding the disc information of a preferred embodiment according to the present invention.

FIG. 4 schematically shows a flow chart of a method for decoding the disc information of a preferred embodiment according to the present invention. Referring to FIG. 4, the method for decoding the DVD disc information is exemplified in the present embodiment. The method comprises the following steps. At first, step S410 is executed, serial data are received, and this step is further divided into following steps. At first, step S405 is executed, the original data signal and the clock signal are received first. Then, step S408 is executed to determine the configuration setup of the disc decoding system. When the pre-treating flag is enabled (e.g. "1"), step S415 is executed, a waveform guaranteed pre-treating is performed on the original data signal, so as to obtain a guaranteed-waveform data signal. Otherwise, when the pre-treating flag is disabled (e.g. "0"), the original data signal is not modulated, so that the waveform of the guaranteed-waveform data signal is the same as the waveform of the original data signal. Finally, a serial data is obtained according to the clock signal and the guaranteed-waveform data signal. Step S415 modulates the original data signal when it is determined that the duration of the same status of the original data signal is less than the minimum transit period, so that the duration of the same status of the output guaranteed-waveform data signal is greater than or equal to the minimum transit period.

The method for modulating the original data signal so as to obtain the guaranteed-waveform data signal when it is determined that the duration of the same status of the original data signal is less than the minimum transit period, e.g. 3 periods of the clock signal in step S415, is further divided into following steps as described in FIG. 2. At first, a first reference data signal is generated according to the original data signal. The first reference data signal lags behind the original data signal, and the two signals differ by at least one reference lag period of the clock signal, e.g., 1.5 period of the clock signal. Further, the rising edge of the first reference data signal is generated fixed on the rising edge or the falling edge of the clock signal, and the duration of the same status of the first reference data signal is greater than or equal to the minimum transit period of the clock signal. Then, the first reference data signal is delayed so as to obtain a second reference data signal, and the two signals differ by one period of the clock signal. Finally, when the duration of the same status of the original data signal is less than the minimum transit period of the clock signal caused by the original data signal being lagged behind the transit, the first reference data signal is used to generate the guaranteed-waveform data signal. Otherwise, the second reference data signal is used to generate the guaranteed-wave-form data signal.

The method for determining whether the original data signal lags behind the transit or not is further divided into the following steps as described in FIG. 2. At first, the duration of the same status of the original data signal is counted according to the rising edge of the clock signal, so as to obtain a rising edge counting value. Meanwhile, the duration of the same status of the original data signal is counted according to the falling edge of the clock signal, so as to obtain a falling edge counting value. Then, it is determined whether the original data signal lags behind the transit if the rising edge counting value is greater than the falling edge counting value.

After step S410 is completed, that is the serial data had been received already, step S420 is then executed. Meanwhile, since the disc is encoded according to an encoding rule, the 8-bit data is encoded to a 16-bit data. Therefore, it is necessary to appropriately extract the 16-bit data, which is waiting for decoding, from the serial data first, e.g. the serial data includes 91 sets of 16-bit data. Then step S425 is executed, since if the 16-bit decoding table is used for querying table and converting code directly, the information of the 16-bit decoding table would be too big and too much. Accordingly, the 16-bit data is encoded to obtain 12-bit data first, and the encoding rule can be expressed by following equation: dvccw={nst,//dvdcw[11]EFMD[15],//dvdcw[10](EFMD[14] or EFMD[13]),//dvdcw[9](EFMD[14] or EFMD[12]),//dvdcw[8](EFMD[11] or EFMD[10]),//dvdcw[7](EFMD[11] or EFMD[9]),//dvdcw[6](EFMD[8] or EFMD[7]),//dvdcw[5](EFMD[8] or EFMD[6]),//dvdcw[4](EFMD[5] or EFMD[4]),//dvdcw[3](EFMD[5] or EFMD[3]),//dvdcw[2](EFMD[2] or EFMD[1]),//dvdcw[1](EFMD[2] or EFMD[0])}//dvdcw[0] Wherein in the equation, dvdcw expresses decoded 12-bit data, EFMD expresses 16-bit data, and nst expresses a status of next 16-bit data.

In general, the encoding is performed according to a principle that each three bits in the 16-bit data is grouped as a small set that includes only 2 bits, so that it can constitute the first 10 bits out of the 12-bit data. Further, the 16th bit EFMD[15] of the 16-bit data is directly converted to be the 11th bit dvdcw [10] of the 12-bit data, and the 12th bit of the 12-bit data is depending on the status of the next 16-bit data.

Then step S435 is executed, in which the 12-bit data is converted into an 8-bit data by querying a modified 12-bit to 8-bit decoding table. Finally step S440 is executed, the 8-bit data is output after it is decoded. The modified 12-bit to 8-bit decoding table has an abnormal 12-bit to 8-bit conversion information. In other words, the 12-bit data belonged to the portion that is received by querying table, not the data obtained by encoding general 16-bit data complying with the encoding rule of the disc information, but rather abnormal 12-bit data generated by encoding the abnormal 16-bit data, which violates the encoding rule of the disc information. For example, in such abnormal 16-bit data, the number of the data "0" appears in two contiguous data "1" is less than 2. Table 1 shows part of the information of the modified decoding table, wherein the 16-bit data expressed by parentheses are the abnormal 16-bit data, which violate the encoding rule of the disc information, and the 12-bit data expressed by a parentheses are the corresponding abnormal 12-bit data.

TABLE 1

| 16-bit data | 12-bit data | 8-bit data |
| --- | --- | --- |
| 16'h2009 | 12'h205 | 8'h0 |
| (16'h2005) | (12'h203) | 8'h0 |
| (16'h2005) | (12'ha03) | 8'h0 |
| 16'h4120 | 12'h33c | 8'h0 |
| (16'h40a0) | (12'h32c) | 8'h0 |
| 16'h0480 | 12'h0a0 | 8'h0 |
| 16'h0480 | 12'h8a0 | 8'h0 |
| (16'h0500) | (12'h0b0) | 8'h0 |
| (16'h0500) | (12'h8b0) | 8'h0 |

Figure 5:
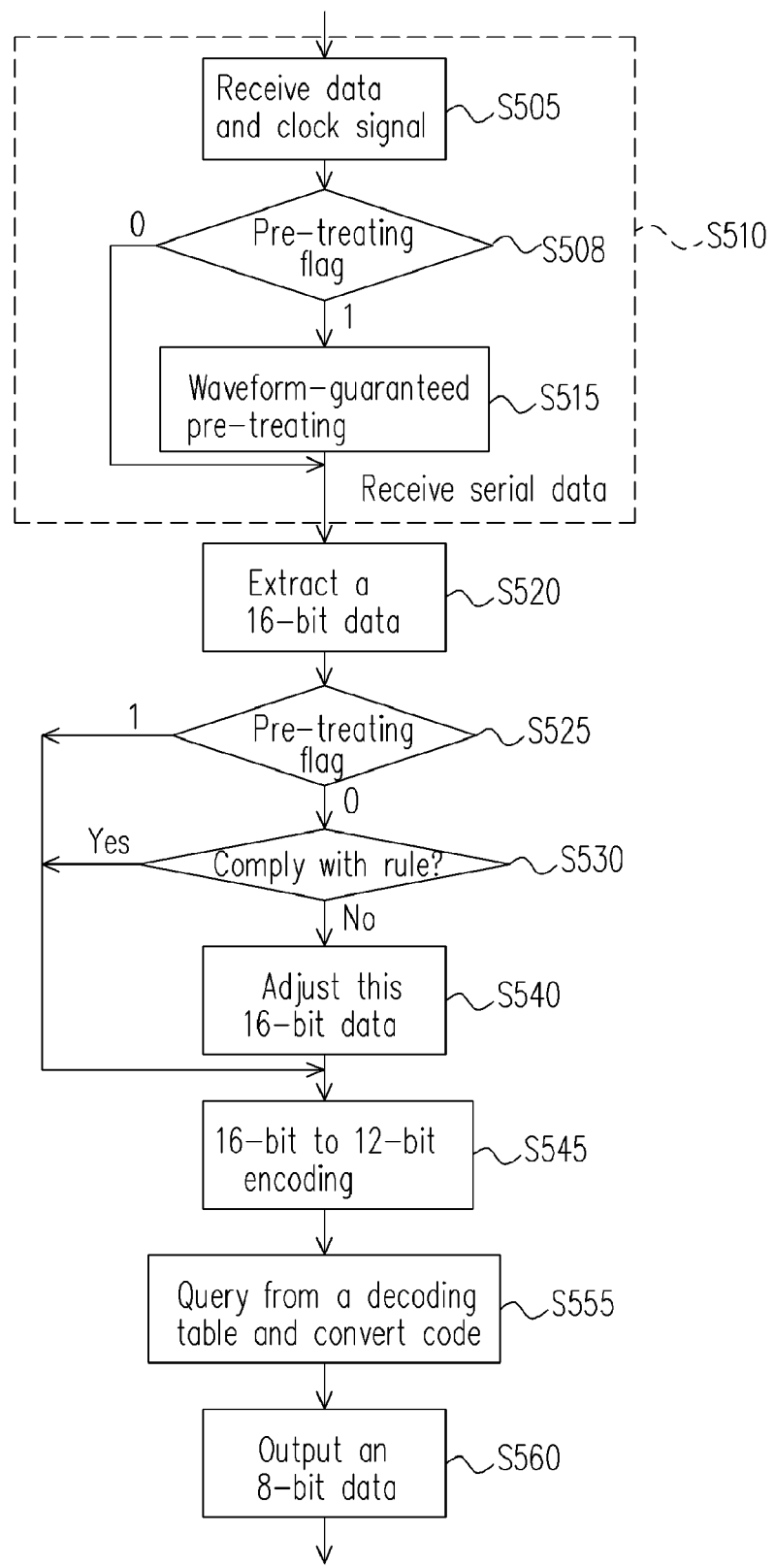
FIG. 5 schematically shows a flow chart of a method for decoding the disc information of the other preferred embodiment according to the present invention.

FIG. 5 schematically shows a flow chart of a method for decoding the disc information of the other preferred embodiment according to the present invention. Referring to FIG. 5, the portion similar to the one shown in FIG. 4 is not described in detail again. The present invention further provides a method for decoding the disc information, and the method comprises following steps. At first, step S510 is executed, that is serial data is received, e.g., receive by using the method mentioned above, and this step is further divided into following steps. At first, step S505 is executed, in which the original data signal and the clock signal are receive, and then step S508 is executed. If it is determined that the pre-treating flag is enabled, step S515 is then executed, so as to perform the waveform guaranteed pre-treating on the original data signal. Otherwise, if the pre-treating flag is disabled, the original data signal is not modulated. Finally, serial data are obtained according to the clock signal and the output guaranteed-waveform data signal.

Then step S520 is executed, that is the 16-bit data is extracted from the serial data. Then step S525 is executed; if it is determined again that the pre-treating flag is enabled, which means the waveform guaranteed pre-treating had been processed already, the process jumps directly to step S545, in which the 16-bit data are not modulated. Otherwise, step S530 is executed. If it is determined that the 16-bit data violates the encoding rule of the disc information, step S540 is executed, in which 16-bit data are modulated so that they become the nearest guessed approximated 16-bit data. For instance, when the number of data "0" appears in two contiguous data "1" of the 16-bit data is less than 2, it is modulated so that the number of data "0" appears in two contiguous data "1" of the 16-bit data is equal to 2. In step S545, the 16-bit data are encoded so as to obtain 12-bit data, and e.g., the encoding method described in FIG. 4 is used for encoding. Then step S555 is executed, in which the 12-bit data are converted into 8-bit data by querying a 12-bit to 8-bit decoding table. Finally, step S560 is executed, and the 8-bit data are output after being decoded.

It will be apparent to one of the ordinary skill in the art that it is not mandatory for having a so-called pre-treating flag in the disc decoding system; instead the waveform guaranteed pre-treating can be performed on all received original data signals. Similarly, it does not matter whether the waveform guaranteed pre-treating has been performed or not, the 16-bit data can be determined and modulated accordingly.

The present invention could be used for especially treating the 16-bit data, which violate the modulation rule. For example, the pre-treating circuit for accessing the disc can modulate the DSEFM signal waveform, so that the DSEFM signal waveform is not changed during at least 3 continuous periods of the clock signal. The present invention also replaces any wrong 16-bit data, which violates the encoding rule, by guessed approximated 16-bit data before they are decoded, or receives approximated 8-bit data, which corresponding to the wrong 16-bit data, by directly referring to a table. Therefore, the subsequent decoding module can acquire more data for continuously processing, so as to improve the data reading reliability and to prevent the "picky disc" or "disc error reading" problem from happening.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

The invention claimed is:

1. A method for decoding disc information, comprising the steps of:

receiving an original data signal and a clock signal;

modulating the original data signal when a duration of the same status of the original data signal is less than a minimum transit period of the clock signal, so as to obtain a guaranteed-waveform data signal, wherein the duration of the same status of the guaranteed-waveform data signal is greater than the minimum transit period of the clock signal, comprising:

generating a first reference data signal according to the original data signal, wherein the first reference data signal lags behind the original data signal, and the two signals differ by at least one reference lag period of the clock signal; further, a rising edge of the first reference data signal is generated fixed on transit edge of the clock signal, and the duration of the same status of the first reference data signal is greater than or equal to the minimum transit period of the clock signal;

delaying the first reference data signal so as to obtain a second reference data signal, wherein the two signals differ by one period of the clock signal; and if the duration of the same status of the original data signal is less than the minimum transit period of the clock signal and is caused by the original data signal being lagged behind the transit, the first reference data signal is used to generate the guaranteed-waveform data signal; otherwise, the second reference data signal is used to generate the guaranteed-waveform data signal; and continuously decoding by using the guaranteed-waveform data signal and the clock signal, so as to obtain the disc information.

2. The method for decoding the disc information of claim 1, wherein the method for determining whether the original data signal lags behind the transit or not, comprises the steps of:

counting a number of the rising edge of the clock signal that appears in the duration of the same status of the original data signal according to a rising edge of the clock signal, so as to obtain a rising edge counting value;

counting a number of the falling edge of the clock signal that appears in the duration of the same status of the original data signal according to a falling edge of the clock signal, so as to obtain a falling edge counting value; and when the rising edge counting value is greater than the falling edge counting value, it is determined that the original data signal lags behind the transit.

3. The method for decoding the disc information of claim 1, wherein the reference lag period is 1.5 period of the clock signal.

4. The method for decoding the disc information of claim 1, wherein the transit edge is either a rising edge or a falling edge of the clock signal.

5. The method for decoding the disc information of claim 1, wherein the minimum transit period is 3 periods of the clock signal.

* * * * *